United States Patent
Gibson et al.

(10) Patent No.: US 6,636,960 B1
(45) Date of Patent: Oct. 21, 2003

(54) METHOD AND APPARATUS FOR RESTEERING FAILING SPECULATION CHECK INSTRUCTIONS

(75) Inventors: James Douglas Gibson, Loveland, CO (US); Rohit Bhatia, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/505,093

(22) Filed: Feb. 16, 2000

(51) Int. Cl.[7] ................................................. G06F 9/40
(52) U.S. Cl. ....................................................... 712/235
(58) Field of Search ................................. 712/216, 233, 712/234, 235, 225, 239, 227; 714/34; 717/124

(56) References Cited

U.S. PATENT DOCUMENTS

| | | | | |
|---|---|---|---|---|
| 4,373,180 A | * | 2/1983 | Linde | 712/239 |
| 4,430,706 A | * | 2/1984 | Sand | 712/237 |
| 4,435,756 A | * | 3/1984 | Potash | 712/237 |
| 4,439,827 A | * | 3/1984 | Wilkes | 712/235 |
| 4,742,451 A | * | 5/1988 | Bruckert et al. | 712/235 |
| 4,827,402 A | | 5/1989 | Wada | 364/200 |
| 5,072,364 A | * | 12/1991 | Jardine et al. | 712/215 |
| 5,454,089 A | | 9/1995 | Nguyen et al. | 395/375 |
| 5,522,053 A | * | 5/1996 | Yoshida et al. | 711/213 |
| 5,542,109 A | | 7/1996 | Blomgren et al. | 395/800 |
| 5,781,752 A | * | 7/1998 | Moshovos et al. | 712/216 |
| 5,809,271 A | | 9/1998 | Colwell et al. | 395/384 |
| 6,163,839 A | * | 12/2000 | Janik et al. | 712/219 |
| 6,202,204 B1 | * | 3/2001 | Wu et al. | 717/151 |
| 6,260,190 B1 | * | 7/2001 | Ju | 717/156 |

OTHER PUBLICATIONS

Hamacher, V. Carl; Vranesic, Zvonko G.; and Zaky, Safwat G. Computer Organization. Fourth Edition. New York: McGraw–Hill Companies, Inc. ©1996. pp. 21–46, 67–71, 118–121, 302–326.*

Hennessy, John L. and Patterson, David A. Computer Architecture A Quantitative Approach. Second Edition. San Francisco, California: Morgan Kaufmann Publishers, Inc. ©1996. pp. 70–89, 124–131, 161–178.*

* cited by examiner

Primary Examiner—Eddie Chan
Assistant Examiner—Aimee J. Li

(57) ABSTRACT

The system is a method and an apparatus for resteering failing speculation check instructions in the pipeline of a processor. A branch offset immediate value and an instruction pointer correspond to each failing instruction. These values are used to determine the correct target recovery address. A relative adder adds the immediate value and the instruction pointer value to arrive at the target recovery address. This is done by flushing the pipeline upon the occurrence of a failing speculation check instruction. The pipeline flush is extended to allow the instruction stream to be resteered. The immediate value and the instruction pointer are then routed through the existing data paths of the pipeline, into the relative adder, which calculates the correct address. A sequencer tracks the progression of these values through the pipeline and causes a branch at the desired time.

20 Claims, 4 Drawing Sheets

METHOD AND APPARATUS FOR RESTEERING FAILING SPECULATION CHECK INSTRUCTIONS

FIELD

The technical field relates generally to digital computer systems. More particularly, it relates to a method and an apparatus for processing branching instructions in a processor.

BACKGROUND

Typical computer systems have a number of common components. These components include a central processing unit (CPU), a bus, memory, and peripheral devices. In high-speed computers, the CPU may be a superscalar, pipelined microprocessor. A superscalar, pipelined microprocessor can include an instruction fetch unit and multiple pipelines. The instruction fetch unit fetches instructions and forwards them to a pipeline. In the pipeline, the instructions flow through multiple pipeline stages, after which the results of the instructions are committed to an architectural state (i.e., memory).

A pipelined microprocessor performs parallel processing in which instructions are executed in an assembly-line fashion. Consecutive instructions are operated upon in sequence, but several instructions are initiated before a first instruction is complete. In this manner, instructions step through each stage of a particular pipeline, one instruction per stage per pipeline at a time.

With respect to instructions processed by a pipeline, methods exist by which data and control functions are speculated. These methods also include means by which the control- or data-speculative calculation is checked for success or failure using a speculation check instruction, also referred to as "chk" instruction. The speculation check instruction checks for a certain condition in the instruction stream. If that condition fails, then the system branches to the target specified in the chk instruction. Existing methods, however, do not efficiently handle mis-speculation. In existing methods, if the speculation fails, the system does not implement the branching behavior defined by the IA-64 architecture. Instead, existing methods handle the failing speculation check instruction through software, rather than using the hardware. These methods cause a fault and invoke a fault handler, which emulates the branching behavior, rather than using hardware to resteer the instruction stream. However, treating exceptions through the fault handler is inefficient.

What is needed is a method for implementing a resteer upon the occurrence of a failing speculation check instruction, rather than faulting to improve performance. In particular, it is desirable to implement a resteer method that substantially uses preexisting hardware to further increase efficiency.

SUMMARY

A method and an apparatus for resteering failing speculation check instructions in the pipeline of a processor. A branch offset immediate value and an instruction pointer correspond to each speculation check instruction. These values are used to determine the correct recovery target address. A relative adder adds the immediate value and the instruction pointer value to arrive at the correct address. This is done by flushing the pipeline upon the occurrence of a failing speculation check instruction. The pipeline flush is extended to resteer the machine to the recovery target address. The immediate value and the instruction pointer are then routed through the existing data paths of the pipeline, into the relative adder, which calculates the recovery target address. A sequencer tracks the progression of these values through the pipeline and effects a branch at the desired time.

The system may be optionally unimplemented by setting it to fault upon the occurrence of a failing speculation check instruction rather than initiating a branch resteer. If the fault is triggered, then a fault handler is invoked and uses software to emulate the branch. Also, the system may be set to operate only if it is first determined that the branch will actually arrive at its destination. This is done by ensuring that certain faults will not prevent a branch.

DETAILED DESCRIPTION

The system is a method and an apparatus for resteering a failing speculation check instruction. By way of illustration only and not by way of limitation, the system is explained in the context of the IA-64 architecture. One skilled in the art will recognize that the method can be implemented on any system that uses speculative instructions, performs a speculation check, and has the ability to resteer the instruction execution based on the speculation check.

The IA-64 architecture provides a speculation check instruction (chk) to determine the validity of a control- or data-speculative calculation. If the chk instruction fails, a branch to IP+target25 is taken by the machine, hereafter referred to as a "check resteer." The IA-64 architecture is described more fully in the IA-64 Application Instruction Set Architecture Guide, Revision 1.0, copyright Intel Corporation/Hewlett-Packard Company (1999), available at http://future.enterprisecomputing.hp.com/ia64/epic/aigsecure.pdf, (hereinafter "IA-64 ISA Guide"), which is hereby incorporated by reference. The branching behavior may be optionally unimplemented. Previous methods have not used the branching behavior of the IA-64 architecture and have provided no means for resteering the speculation check instructions through the existing hardware. Instead, existing methods trigger a fault upon the detection of a mis-speculation and invoke a fault handler, which is inefficient. The system implements the branching behavior available on the IA-64 architecture and largely uses hardware that is already used in the processor.

Figure 1:
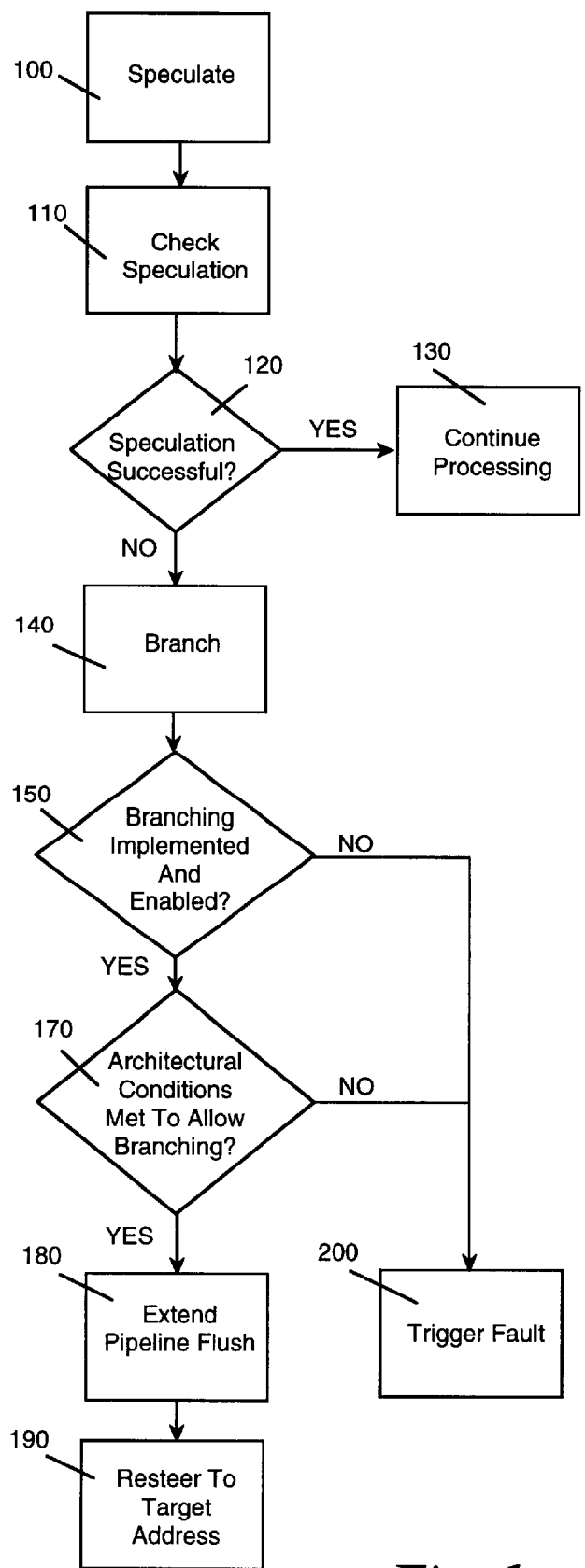
FIG. 1 is a flow chart of the method of the system.

FIG. 1 shows a flow chart of the method of the system. In operation, a control- or data-speculative calculation speculates 100 the result of an operation. The speculated result is then checked 100 using a chk instruction. If the speculation was correct 120, then the processor continues to process 130 pipelined instructions. If the speculation was incorrect, then the IA-64 architecture branches 140 to perform a check resteer. The method then determines 150 whether check resteering has been implemented and enabled. If check resteering is not enabled, then a fault is triggered 200 and a fault handler is invoked. In prior methods, check resteering was not implemented, so a fault was always triggered at this stage and the fault handler invoked. The system implements the check resteering behavior so this is always "implemented." One embodiment also includes an "on/off switch" allowing the user to selectively enable and disable the check resteer function.

If check resteering has been enabled 150, then the system determines 170 whether certain architectural conditions are met to allow check resteering. In one embodiment of the system, check resteering is not allowed unless four conditions are met. The IA-64 architecture defines values for certain status registers. In one embodiment it is desirable to implement the check resteer upon the following conditions of four status register values. These conditions are represented by the following four enable bits in the PSR register, which must be set to the corresponding conditions to allow branching: PSR.ss=0, PSR.tb=0, PSR.ic=1, and PSR.it=1.

The PSR.ss refers to a single step trap enable. PSR.tb refers to a branch trap enable. PSR.ic refers to an interruption collection enable. PSR.it refers to instruction translation enable. That is, single step traps and branch traps are not enabled, but interrupt collection and instruction translation are enabled. These bits are described more fully in the IA-64 ISA Guide. In normal operation of the IA-64 processor, these enable bits are set to satisfy the implementation of the system. When operating in real mode, rather than, for example, virtual address translation mode or debug mode, these control bits are set to allow implementation of the check resteering.

These conditions are used to ensure that when a branch or a check resteer is taken architecturally it will arrive at the desired target. For example, in the case of a branch trap, a branch trap handler is used. This would make resteering difficult, so instead, in one embodiment the check resteering does not occur when a branch trap is taken. Instead, a branch fault is taken 200, and the fault handler is invoked to handle a speculation fault by emulating the failing speculation check instruction.

If the above conditions are met and branching is allowed, then the exception data handler (also referred to as the "XPN unit" or "XPN block") 24 "flushes" 180 the core pipeline 20. That is, it clears 180 all pending instructions in various stages of processing in the pipeline 20. The XPN unit 24 also extends 180 this pipeline flush to implement 190 the instruction stream. That is, the XPN unit 24 prevents the fetch engine 22 from sending any further instructions to the core pipeline 20 until the failing speculation check instruction has been resteered. In one embodiment, the XPN unit 24 extends the pipeline flush for at least eight clock cycles. During this extended pipeline flush, the failing speculation check instruction is resteered 190 to its recovery target address.

Figure 2:
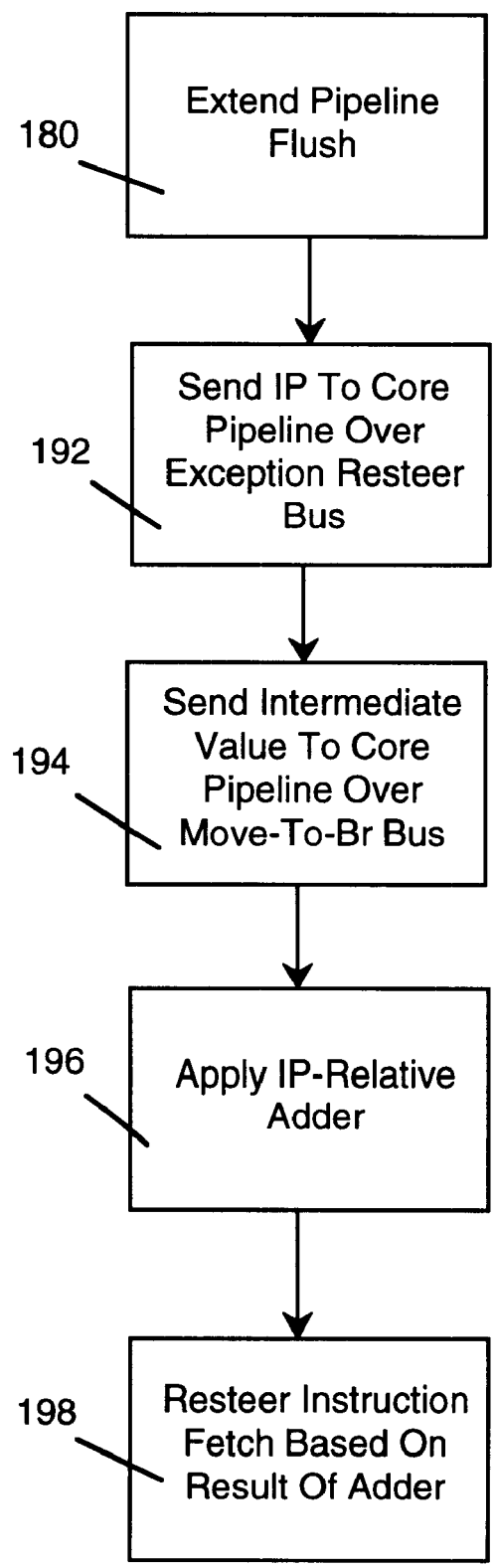
FIG. 2 is a flow chart showing the resteering method.

FIG. 2 is a more detailed diagram of the resteer method. After the pipeline 20 has been flushed and during the following clock cycles, the XPN unit 24 sends 192 a current instruction pointer (IP) 50 to the core pipeline 20. The XPN unit 24 also sends a control signal 54 to an IIM register 30 in the integer data path (IDP) 28. This control signal 54 allows the IIM register 30 to hold an immediate value 60 from the failing speculation check instruction. The immediate value 60 is an IP-relative, signed branch offset value. The IDP 28 then sends 194 the immediate value to the core pipeline 20 where the immediate value is sign-extended to a 64-bit value. Within the core pipeline 20, the sign-extended immediate value 60 and the current IP value 50 are added together 196 using an IP-relative adder. The result of this relative add function becomes the recovery target address 58, which is also referred to as the target IP 58. A sequencer 26 in the XPN unit 24 tracks the progression of the immediate value and the current IP through the core pipeline 20. At the appropriate point in the core pipeline 20, the XPN unit 24 causes the failing speculation check instruction to branch 198 to the recovery target address 58. This is done by sending the target IP 58 back to the instruction fetch unit 22. Tile instruction fetch unit 22 then restarts the program execution at the recovery target address. In one embodiment, the pipeline remains cleared and stalled until the instruction fetch unit 22 sends the instruction from the recovery target address 58 to the core pipeline. When the instruction is sent, the pipeline stall is released and the pipeline continues processing new instructions.

Figure 3:
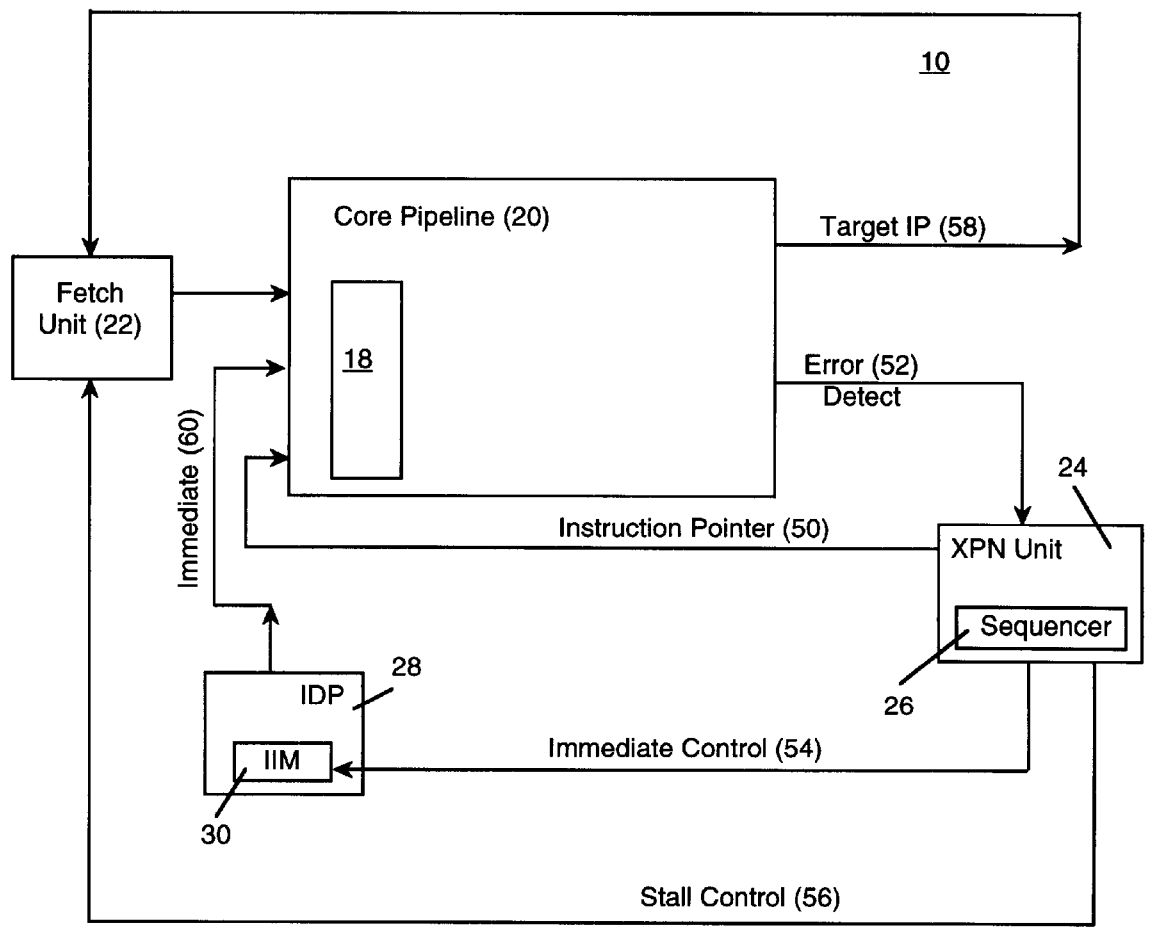
FIG. 3 is a block diagram showing the computer system implementing the method.

FIG. 3 shows a simplified block diagram of a microprocessor 10 having a core pipeline 20 and an instruction fetch unit 22 that sends instructions to the pipeline 20. The instructions are processed in multiple stages within the pipeline 20 and eventually output to an architectural state, or memory. The processor 10 also has an XPN unit 24. At one stage of the pipeline 20, erroneously speculated instructions are identified by the chk instruction, and an indication of the mis-speculation 52 is given to the XPN unit 24.

The processor 10 also has a sequencer 26. In the embodiment shown in FIG. 3, the sequencer 26 is part of the XPN unit 20. Upon the failure of a chk instruction, the sequencer 26 flushes the pipeline 20 by canceling any pending instructions using a stall control signal 56. The sequencer 26 also controls the fetch engine 22 and, in the case of a mis-speculation, prevents the instruction fetch unit 22 from sending new instructions to the pipeline 20 until the failing speculative instruction has been resteered, using the stall control signal 56. In one embodiment, this effectively extends the pipeline flush for at least eight cycles while the instruction stream is resteered.

Upon the failure of a speculated instruction, the processor 10 resteers the instruction to the correct address by causing the instruction to branch to a recovery target address re-created from the relative sum of the current IP 50 and a sign-extended immediate value 60. The XPN unit 20 sends the current EP 50 to the branch unit 18 of the core pipeline 20 on an exception resteer bus 330. The XPN unit 20 also sends an immediate control signal 54 to an IDM register 30 on the WIP 28. This signal 54 causes the IDM 30 to hold the immediate value 60 of the failing instruction. The immediate value 60 is then sent along the IDP 28 to the branch unit 18 of the core pipeline 20.

Once in the core pipeline 20, the immediate value 60 and the current IP value 50 are processed though the pipeline stages like any other relative address function. The immediate value 60 is sign-extended to become a 64-bit value. The sign-extended inmmediate value 60 and the current IP value 50 are added together using a relative adder 410. The output of the adder 410 is the recovery target address 58, or target IP 58, of the failing speculation check instruction. As the current IP value 50 and the immediate value 60 progress through the core pipeline 20, the sequencer 26 keeps track of their position in the pipeline 20. When they reach the proper point in the pipeline 20, the sequencer 26 causes the instruction stream to resteer to the recovery target address 58. This is performed by sending the target IP 58 back to the instruction fetch unit 22 while the pipeline 20 is cleared and stalled. The instruction fetch unit 22 then sends the desired instruction to the core pipeline 20, and the stall is released.

The processor 10 also has a sequencer 26. In the embodiment shown in FIG. 3, the sequencer 26 is part of the XPN unit 24. Upon the failure of a chk instruction, the sequencer 26 flushes the pipeline 20 by canceling any pending instructions using a stall control signal 56. The sequencer 26 also controls the fetch engine 22 and, in the case of a misspeculation, prevents the instruction fetch unit 22 from sending new instructions to the pipeline 20 until the failing speculative instruction has been resteered, using the stall control signal 56. In one embodiment, this effectively extends the pipeline flush for at least eight cycles while the instruction stream is resteered.

In a processor 10, an XPN unit 24 having control logic is used to detect a failing condition. Upon the detection of a failing condition, the XPN unit 24 issues a pipeline flush and also sends certain control information to the integer data path (IDP) 450 (and shown generally as blocks 370 through 440). The XPN unit 24 sends an immediate control signal 54 (not shown in FIG. 4) that causes the IIM register 30 of the IDP 450 to store the immediate value 60 from the check instruction. The immediate value 60 is the signed extended branch offset that is used by the system in the event of a failing check.

The value of the IIM register 30 is then sent through data-forwarding logic 380 and over to the branch unit 18 of the core pipeline 20. This value is then sent to a move-to-branch (MTB) data detect register 390 and then to a multiplexor 400. The output of the multiplexor 400 is fed into a relative adder 410, where it is added to the current IP value 50. At this point, the immediate value 60 has become a 64-bit sign-extended value.

The XPN unit 24 uses a current instruction pointer (IP) 50 to track the relative addresses of instructions. Upon the detection of a failing speculation check instruction, the XPN unit 24 sends the current IP value 50 as data into the branch unit 18 of the core pipeline 20 on the exception resteer bus 330. In the core pipeline 20, the current IP value 50 is sent through a register 340 before it passes through a multiplexor 350, another input of which is the normal data path. The output of the multiplexor 350 is fed into a bundle IP register (BndIpReg) 360, and then into the relative adder 410, where it is added to the sign-extended immediate value 60.

In the embodiment shown, the output of the adder 410 is then fed into an IP relative data execution register 420 and then into an IP relative data detect register 430. The output of that register then becomes one of the inputs of a multiplexor 440, the output of which leaves the core pipeline 20 and returns to the instruction fetch unit 22. Based on the output of the summation of the current IP value 50 and the sign-extended immediate value 60, the instruction branches to the recovery target address 58. The branch occurs at a designated point in the pipeline, and the sequencer 26 tracks the progress of these values to ensure that the branch occurs at the designated point.

When the branch point is reached, the recovery target address 58, also referred to as the target IP 58, is sent back to the instruction fetch unit 22. At this point, the pipeline 20 remains cleared and stalled by the stall control 56 of the sequencer 26. This prevents new instructions from being sent by the instruction fetch unit 22 to the core pipeline 20. When the instruction fetch unit 22 receives the target IP 58, the instruction fetch unit 22 delivers a new instruction to the core pipeline 20 based on the target IP 58. At this point, the stall is released and the system continues to process new instructions.

Figure 4:
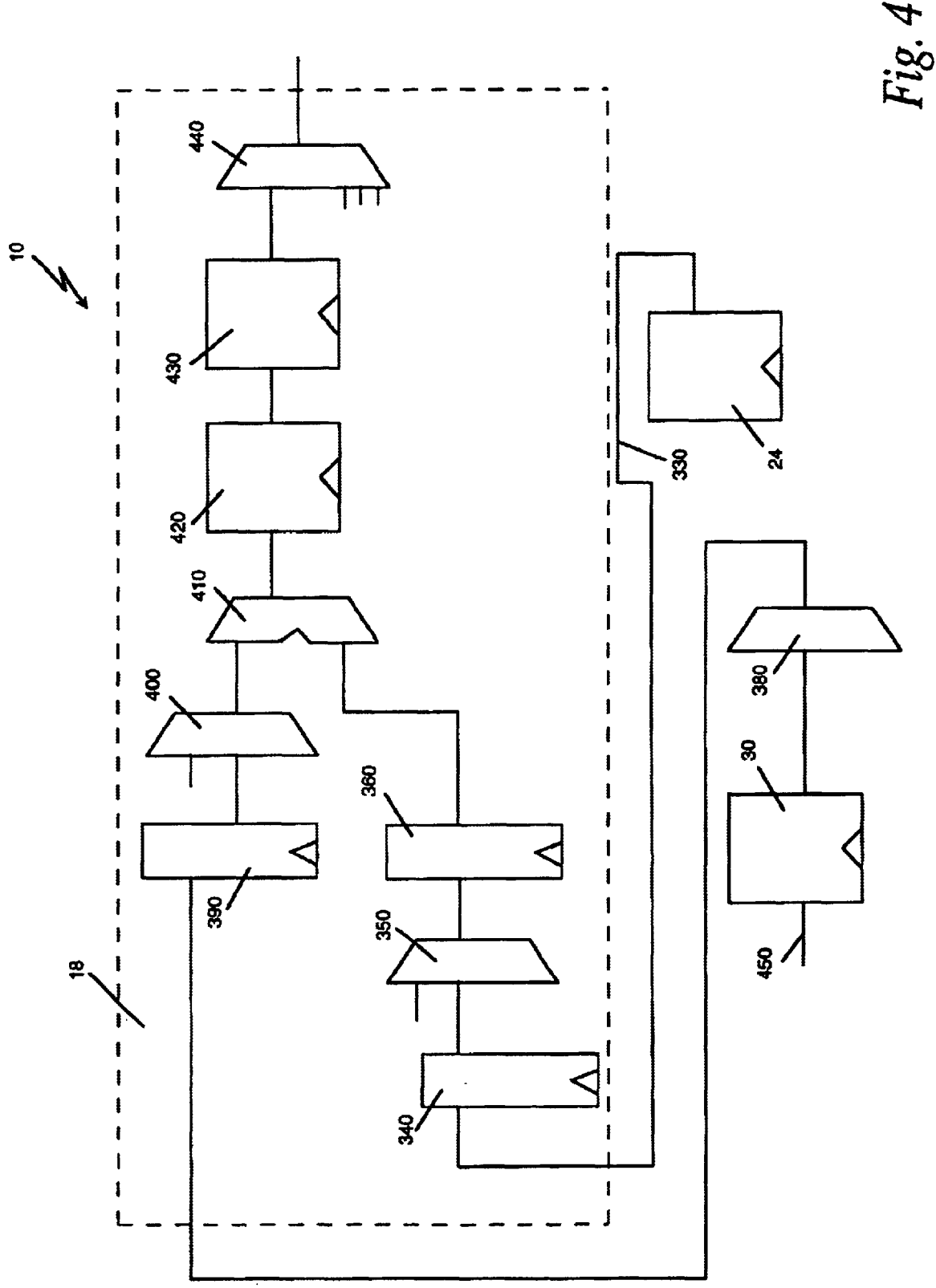
FIG. 4 is a block more detailed diagram of the computer system of FIG. 3.

One skilled in the art will recognize that the embodiment of the system shown in FIG. 4 resteers the failing speculation check instruction by reusing the processor's existing data paths. A resteer could be performed without all of the hardware shown in FIG. 4. In the embodiment of FIG. 4, however, the existing data paths of the processor include this hardware. The embodiment shown leverages the existing hardware by allowing the immediate value 60 and current IP value 50 to travel through the same data paths normally used to process instructions. By extending the pipeline flush, the system ensures that those data paths will be available to resteer the instruction stream. Once the instruction stream has been resteered, the stall is released.

Although the system has been described in detail with reference to certain embodiments thereof, variations are possible. For example, although the values of certain data, sizes of the pipelines, particular logic elements, clock cycles, and other certain specific information were given as examples, these examples were by way of illustration only, and not by way of limitation. The system may be embodied in other specific forms without departing from the essential spirit or attributes thereof. It is desired that the embodiments described herein be considered in all respects as illustrative, not restrictive, and that reference be made to the appended claims for determining the scope of the invention.

What is claimed is:

1. A method for resteering a failing speculation check instruction comprising,
  speculating a calculation;
  checking the validity of the speculated calculation using a chk instruction; and
  if the speculated calculation is invalid,
    calculating a recovery target address; and
    determining whether a branch instruction would reach the recovery target address by determining whether either a branch trap or a single step trap is taken; and
    branching to the recovery target address only if neither the single trap nor the branch trap is taken, and otherwise faulting and invoking a fault handler to resteer the failing speculation check instruction.

2. The method of claim 1, further comprising:
  if the speculated calculation is invalid,
    clearing at least one pending instruction in a pipeline in which the failing instruction is being processed;
    preventing further instructions from entering the pipeline until the failing speculation check instruction has been resteered; and
    using at least one data path in the pipeline to calculate the recovery target address.

3. The method of claim 2, wherein calculating the recovery target address further comprises,
  sending a branch offset immediate value to the pipeline; and
  sending a current instruction pointer (IP) corresponding to the chk instruction to the pipeline; and
  using an IP-relative branch adder to calculate the recovery target address by adding the immediate value and the current IP value.

4. The method of claim 3, further comprising:
  sending the recovery target address to an instruction fetch unit that retrieves a target instruction corresponding to the recovery target address and sends the target instruction to the pipeline.

5. The method of claim 4, further comprising:
  storing the immediate value in a register of an integer data path;
  routing the immediate value to a branch unit of the pipeline;
  routing the current IP from an XPN unit to the branch unit; and routing the immediate value and the current IP to the IP-relative branch adder.

6. The method of claim 5, further comprising:

tracking the progression of the immediate value, the current IP value, and the recovery target address through the pipeline using a sequencer;

sending the recovery target address to the instruction fetch unit when the recovery target address reaches a predetermined point in the pipeline;

fetching an instruction based on the recovery target address; and allowing further instructions to enter the pipeline after the fetching.

7. A method of resteering a failing speculation check instruction comprising:

clearing at least one pending instruction in a pipeline of a processor on which the failing speculation check instruction is being processed;

preventing new instructions from entering the pipeline for a period of time to allow the failing instruction to be resteered;

maintaining a current instruction pointer (IP) for the failing speculation check instruction;

identifying a branch offset value for the instruction, wherein said branch offset value is an IP-relative branch offset;

calculating a recovery target address for the instruction based on the current IP and the branch offset value, wherein the step of calculating comprises sending the current IP and the branch offset value to the pipeline, during the period of time, using existing instruction data paths that otherwise carry instructions; and branching the instruction to the recovery target address.

8. The method of claim 7 further comprising:

applying a relative add function to the current IP and the branch offset value to calculate the recovery target address.

9. The method of claim 7, further comprising:

tracking the progression of the current IP and the immediate value through the at least one existing data path of the pipeline; and causing the instruction to branch when the current IP and the branch offset value reach a designated point in the pipeline.

10. The method of claim 9, further comprising:

determining whether a branch instruction would reach the recovery target address; and if the branch instruction would not reach the recovery target address, then faulting and invoking a fault handler to resteer the code.

11. A computer system capable of resteering a failing speculation check instruction comprising:

i. A core pipeline that receives and executes instructions;
ii. An instruction fetch unit electrically connected to the core pipeline, which sends instructions to the core pipeline; and
iii. A sequencer capable of controlling the flow of instructions through the core pipeline, wherein, upon the occurrence of a failing speculation check instruction, the sequencer
 (1) Clears a pending instruction in the core pipeline,
 (2) Prevents new instructions from being delivered to the core pipeline for a period of time after the pending instruction is cleared to allow the failing instruction to be resteered, and
 (3) Delivers a current instruction pointer (IP) value and a branch offset immediate value to the core pipeline, during the period of time, wherein the current IP value and the branch offset immediate value proceed through the core pipeline along one or more existing instruction data paths that otherwise carry instructions when the pipeline is not cleared, wherein the failing speculation check instruction is resteered to a recovery target address based on the current IP value and the branch offset immediate value.

12. The computer system of claims 11, wherein at least one of the instruction data path comprises:

i. A register capable of holding a branch offset immediate value and capable of delivering the immediate value to the core pipeline.

13. The computer system of claim 12, further comprising:

i. An XPN unit, wherein the sequencer is part of the XPN unit and wherein the XPN unit causes the branch offset immediate value to enter the register upon the occurrence of a failing speculation check instruction.

14. The computer system of claim 11, wherein the branch offset immediate value is an IP-relative branch offset, and wherein the branch offset immediate value and the current IP value are added together in the core pipeline to generate the recovery target address.

15. The computer system of claim 14, wherein the recovery target address is sent to the instruction fetch unit, and wherein the instruction fetch unit sends an instruction to the core pipeline based on the recovery target address.

16. The computer system of claim 15, wherein, the XPN unit determines if a failing speculation check instruction can branch to the recovery target address without faulting; and if the failing speculation check instruction can branch to the recovery target address, then the XPN unit causes the failing speculation check instruction to branch to the recovery target address; and if the failing speculation check instruction cannot branch to the recovery target address without faulting, then the XPN unit triggers a fault; and a fault handier is invoked.

17. The method of claim 1, wherein the method is implemented in an IA-64 architecture that operates in a real mode and in a virtual address translation mode, and wherein the step of determining comprises determining whether branching is enabled by checking status registers, and wherein the branching is only enabled when operating in the real mode.

18. The method of claim 7, wherein the step of determining comprises checking status registers of the processor, wherein the status registers include a single step trap register, a branch trap register, an interruption collection enable register, and an instruction translation enable register, and wherein the branch instruction would reach the recovery target address only if the single step trap register is not set, the branch trap register is not set, the interruption collection enable register is set, and the instruction translation register is set.

19. The system of claim 11, wherein, upon the occurrence of a failing speculation check instruction, the sequencer prevents new instructions from being delivered to the core pipeline for at least eight clock cycles.

20. The system of claim 11, further comprising a muliplexor having a first input that receives the current IP value and a second input that receives instructions to be processed through the core pipeline, and wherein the first input is selected upon the occurrence of the failing speculation check instruction.

* * * * *

UNITED STATES PATENT AND TRADEMARK OFFICE
CERTIFICATE OF CORRECTION

PATENT NO. : 6,636,960 B1
DATED : October 21, 2003
INVENTOR(S) : Jon L. Ashbum

It is certified that error appears in the above-identified patent and that said Letters Patent is hereby corrected as shown below:

Column 2,
Line 59, delete "100" and insert therefor -- 110 --

Column 4,
Line 7, delete "Tile" and insert therefor -- The --

Column 8,
Line 38, delete "handier" and insert therefor -- handler --

Signed and Sealed this

Fifth Day of April, 2005

JON W. DUDAS
*Director of the United States Patent and Trademark Office*